US012694202B2

(12) United States Patent
Cao et al.

(10) Patent No.: US 12,694,202 B2
(45) Date of Patent: Jul. 28, 2026

(54) DATA PROCESSING METHOD AND APPARATUS

(71) Applicant: Shanghai Hode Information Technology Co., Ltd., Shanghai (CN)

(72) Inventors: Xiang Cao, Shanghai (CN); Tianpeng Zhou, Shanghai (CN); Yaqin Huang, Shanghai (CN); Haoran Wang, Shanghai (CN)

(73) Assignee: Shanghai Hode Information Technology Co., Ltd., Shanghai (CN)

( * ) Notice: Subject to any disclaimer, the term of this patent is extended or adjusted under 35 U.S.C. 154(b) by 288 days.

(21) Appl. No.: 18/682,712

(22) PCT Filed: Jun. 16, 2022

(86) PCT No.: PCT/CN2022/099263
§ 371 (c)(1),
(2) Date: Feb. 9, 2024

(87) PCT Pub. No.: WO2023/020091
PCT Pub. Date: Feb. 23, 2023

(65) Prior Publication Data
US 2024/0386192 A1      Nov. 21, 2024

(30) Foreign Application Priority Data

Aug. 17, 2021    (CN) .......................... 202110944010.0

(51) Int. Cl.
*G06F 40/166*      (2020.01)
*G06Q 10/101*      (2023.01)

(52) U.S. Cl.
CPC ......... *G06F 40/166* (2020.01); *G06Q 10/101* (2013.01)

(58) Field of Classification Search
CPC ..................................................... G06F 40/166
See application file for complete search history.

(56) References Cited

U.S. PATENT DOCUMENTS

2009/0198719 A1*   8/2009   DeWitt .................. G06F 17/30
2011/0113336 A1*   5/2011   Gunatilake ............... G06F 3/01
(Continued)

FOREIGN PATENT DOCUMENTS

CN        102332174 A      1/2012
CN        102916998 A      2/2013
(Continued)

OTHER PUBLICATIONS

International Patent Application No. PCT/CN2022/099263; Int'l Search Report; dated Aug. 30, 2022; 2 pages.

*Primary Examiner* — James J Debrow
(74) *Attorney, Agent, or Firm* — BakerHostetler

(57) ABSTRACT

This application provides techniques for processing data. The techniques includes receiving requests for editing an initial story draft from at least two client devices, and adding each request to a draft editing queue; extracting a first request for editing the initial story draft by a first client device from the draft editing queue, obtaining first draft editing information in the first request, and editing the initial story draft based on the first draft editing information to obtain an initial modified story draft; extracting a second request for editing the initial story draft by a second client device from the draft editing queue, obtaining second draft editing information in the second request, and generating to-be-responded draft information according to the first draft editing information and the second draft editing information; and editing the initial modified story draft based on the to-be-responded draft information to generate a target story draft.

14 Claims, 8 Drawing Sheets

Receive draft editing requests sent by at least two clients for an initial story draft, and add the draft editing request sent by each client to a draft editing queue ⟋ 102

Extract a first draft editing request of a first client for the initial story draft from the draft editing queue, obtain first to-be-responded draft information in the first draft editing request, and edit the initial story draft based on the first to-be-responded draft information to obtain an initial modified story draft ⟋ 104

Extract a second draft editing request of a second client for the initial story draft from the draft editing queue, obtain second to-be-responded draft information in the second draft editing request, and generate to-be-responded draft information according to the first to-be-responded draft information and the second to-be-responded draft information ⟋ 106

Edit the initial modified story draft based on the to-be-responded draft information to obtain a target story draft ⟋ 108

(56)             References Cited

U.S. PATENT DOCUMENTS

2017/0289210 A1      10/2017  Pai et al.
2020/0356624 A1*   11/2020  Cai et al.  ............ G06F 17/2288
2025/0173504 A1*    5/2025  Pan et al.  .............. G06F 40/197

FOREIGN PATENT DOCUMENTS

CN              112367403  A     2/2021
WO      WO 2004/015897  A2     2/2004

* cited by examiner

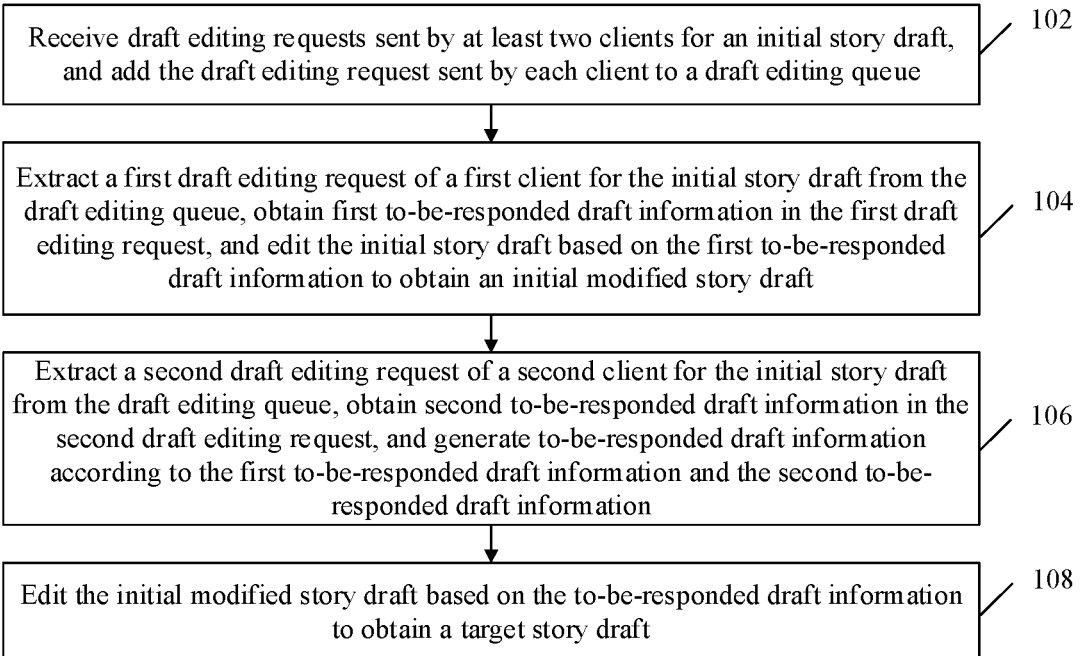

| | |
|---|---|
| Receive draft editing requests sent by at least two clients for an initial story draft, and add the draft editing request sent by each client to a draft editing queue | 102 |
| Extract a first draft editing request of a first client for the initial story draft from the draft editing queue, obtain first to-be-responded draft information in the first draft editing request, and edit the initial story draft based on the first to-be-responded draft information to obtain an initial modified story draft | 104 |
| Extract a second draft editing request of a second client for the initial story draft from the draft editing queue, obtain second to-be-responded draft information in the second draft editing request, and generate to-be-responded draft information according to the first to-be-responded draft information and the second to-be-responded draft information | 106 |
| Edit the initial modified story draft based on the to-be-responded draft information to obtain a target story draft | 108 |

FIG. 1

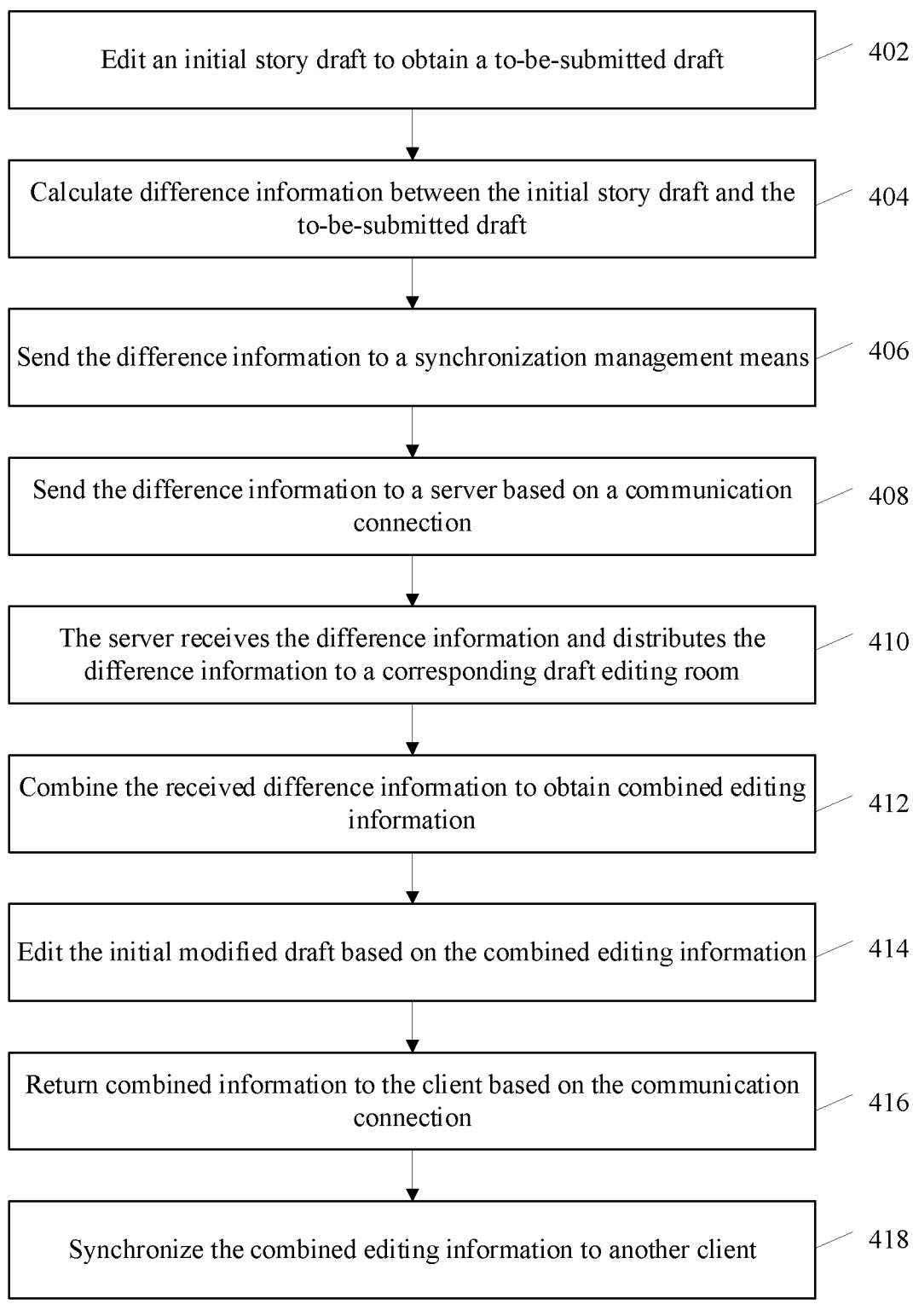

Edit an initial story draft to obtain a to-be-submitted draft — 402

Calculate difference information between the initial story draft and the to-be-submitted draft — 404

Send the difference information to a synchronization management means — 406

Send the difference information to a server based on a communication connection — 408

The server receives the difference information and distributes the difference information to a corresponding draft editing room — 410

Combine the received difference information to obtain combined editing information — 412

Edit the initial modified draft based on the combined editing information — 414

Return combined information to the client based on the communication connection — 416

Synchronize the combined editing information to another client — 418

FIG. 4a

DATA PROCESSING METHOD AND APPARATUS

CROSS-REFERENCE TO RELATED APPLICATIONS

This application is the U.S. National Stage of International Application No. PCT/CN2022/099263, filed on Jun. 16, 2022, which claims priority to Chinese Patent Application No. 202110944010.0, filed on Aug. 17, 2021, and entitled "DATA PROCESSING METHOD AND APPARATUS", both of which are incorporated herein by reference in their entireties.

TECHNICAL FIELD

This application relates to the field of Internet technologies, and in particular, to a data processing method. This application also relates to a data processing apparatus, a computing device, a computer-readable storage medium, and a computer program.

BACKGROUND

With continuous development of computer technologies, many document programs have a multi-person collaboration function, to improve working efficiency by allowing a plurality of persons to process a same document. Currently, a mainstream document program has a multi-person cooperation function, and a final output is a document. Video production is as complex and time-consuming as document processing, and existing video production manners are mostly independent production or offline cooperation in stages. A multi-person collaborative document improves working efficiency through collaboration, but there is a lack of a collaboration manner for real-time collaboration to edit a video and finally output an edited video.

How to implement multi-person real-time video editing becomes an urgent problem to be solved by a person skilled in the art.

SUMMARY

In view of this, an embodiment of this application provides a data processing method. This application also relates to a data processing apparatus, a computing device, a computer-readable storage medium, and a computer program, to resolve a problem in the conventional technology that there is a lack of a data processing method for a plurality of persons to edit data in real time.

According to a first aspect of the embodiments of this application, a data processing method is provided and is applied to a server device, including:

receiving draft editing requests sent by at least two client devices for an initial story draft, and adding the draft editing request sent by each client device to a draft editing queue;

extracting a first draft editing request of a first client device for the initial story draft from the draft editing queue, obtaining first to-be-responded draft information in the first draft editing request, and editing the initial story draft based on the first to-be-responded draft information to obtain an initial modified story draft;

extracting a second draft editing request of a second client device for the initial story draft from the draft editing queue, obtaining second to-be-responded draft information in the second draft editing request, and generating to-be-responded draft information according to the first to-be-responded draft information and the second to-be-responded draft information; and editing the initial modified story draft based on the to-be-responded draft information to obtain a target story draft.

According to a second aspect of the embodiments of this application, a data processing method is provided and is applied to a client device, including:

receiving an initial story draft sent by a server device;

editing the initial story draft in response to a draft editing request to obtain to-be-submitted draft information;

submitting the to-be-submitted draft information to the server device in response to an information submission request, to obtain to-be-responded draft information;

when receiving response information returned by the server device, determining that the to-be-responded draft information is draft modification information; and generating a client story draft based on the draft modification information and the initial story draft.

According to a third aspect of the embodiments of this application, a data processing apparatus is provided and is applied to a server device, including:

an addition means, configured to: receive draft editing requests sent by at least two client devices for an initial story draft, and add the draft editing request sent by each client device to a draft editing queue;

an extraction means, configured to: extract a first draft editing request of a first client device for the initial story draft from the draft editing queue, obtain first to-be-responded draft information in the first draft editing request, and edit the initial story draft based on the first to-be-responded draft information to obtain an initial modified story draft;

a first generation means, configured to: extract a second draft editing request of a second client device for the initial story draft from the draft editing queue, obtain second to-be-responded draft information in the second draft editing request, and generate to-be-responded draft information according to the first to-be-responded draft information and the second to-be-responded draft information; and a first editing means, configured to edit the initial modified story draft based on the to-be-responded draft information to obtain a target story draft.

According to a fourth aspect of the embodiments of this application, a data processing apparatus is provided and is applied to a client device, including:

a receiving means, configured to receive an initial story draft sent by a server device;

a second editing means, configured to edit the initial story draft in response to a draft editing request to obtain to-be-submitted draft information;

a submission means, configured to submit the to-be-submitted draft information to the server device in response to an information submission request, to obtain to-be-responded draft information;

a determining means, configured to: when response information returned by the server device is received, determine that the to-be-responded draft information is draft modification information; and a second generation means, configured to generate a client story draft based on the draft modification information and the initial story draft.

According to a fifth aspect of the embodiments of this application, a computing device is provided, including a memory, a processor, and computer instructions stored in the memory and capable of being run on the processor, and the processor executes the computer instructions to implement the steps of the data processing method.

According to a sixth aspect of the embodiments of this application, a computer-readable storage medium is provided, storing computer instructions, and the computer instructions are executed by a processor to implement the steps of the data processing method.

According to a seventh aspect of the embodiments of this application, a computer program is provided, and when the computer program is executed on a computer, the computer is enabled to perform the steps of the data processing method.

The data processing method provided in this application includes: receiving draft editing requests sent by at least two client devices for an initial story draft, and adding the draft editing request sent by each client device to a draft editing queue; extracting a first draft editing request of a first client device for the initial story draft from the draft editing queue, obtaining first to-be-responded draft information in the first draft editing request, and editing the initial story draft based on the first to-be-responded draft information to obtain an initial modified story draft; extracting a second draft editing request of a second client device for the initial story draft from the draft editing queue, obtaining second to-be-responded draft information in the second draft editing request, and generating to-be-responded draft information according to the first to-be-responded draft information and the second to-be-responded draft information; and editing the initial modified story draft based on the to-be-responded draft information to obtain a target story draft.

In this embodiment of this application, the draft editing requests in the draft editing queue are obtained, so that the draft editing requests are processed according to a sequence of receiving the draft editing requests. The to-be-responded draft information in the draft editing requests is obtained to further edit the initial story draft. Draft editing requests of different client devices for the initial story draft are responded to in a sequence in the draft editing queue. Draft information for a same attribute in to-be-responded draft information of the different client devices is selected.

This avoids a conflict that occurs when the draft is modified in real time, and efficiently processes draft editing information sent by a plurality of persons in real time.

BRIEF DESCRIPTION OF DRAWINGS

FIG. 1 is a flowchart of a data processing method applied to a server device according to an embodiment of this application;

FIG. 4a is a flowchart of a data processing method applied to a client device 5 according to an embodiment of this application;

DESCRIPTION OF EMBODIMENTS

Figure 2:
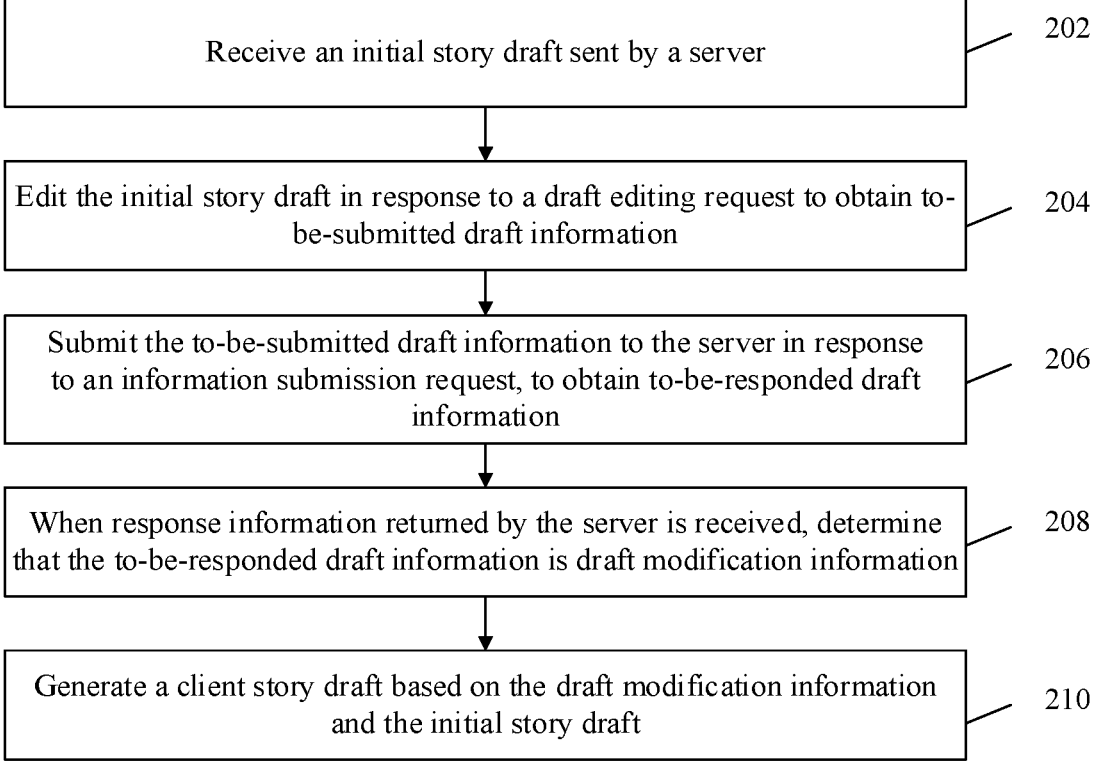
FIG. 2 is a flowchart of a data processing method applied to a client device according to an embodiment of this application.

Many specific details are described in the following description to facilitate full understanding of this application. However, this application can be implemented in many other manners different from those described herein, and a person skilled in the art can make similar promotion without departing from the connotation of this application. Therefore, this application is not limited by specific implementations disclosed below.

Terms used in one or more embodiments of this application are merely for the purpose of describing a specific embodiment, and are not intended to limit the one or more embodiments of this application. The terms "a", "the", and "said" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to distinguish between information of the same type. For example, without departing from the scope of one or more embodiments of this application, "first" may also be referred to as "second", and similarly, "second" may also be referred to as "first". Depending on the context, for example, the word "if" used herein can be interpreted as "while", "when", or "in response to determining".

Terms used in one or more embodiments of this application are explained first.

JSON: JSON is a data format, and is widely used in Web application development. JSON stores data in a key-value pair manner. Currently, mainstream programming languages support generation and parsing of data in a JSON format. JSON is widely used in scenarios such as data exchange and storage.

Diff: Diff is an algorithm, and is used to compare two files and output a difference. Usually, a file extension of the output difference is patch.

Patch: Patch refers to file difference information generated by a diff algorithm. In this application, a data structure named Patch is defined to describe this difference.

This application provides a data processing method. This application also relates to a data processing apparatus, a computing device, a computer-readable storage medium, and a computer program. The data processing method, the data processing apparatus, the computing device, the computer-readable storage medium, and the computer program are described in detail in the following embodiments one by one.

FIG. 1 is a flowchart of a data processing method applied to a server device according to an embodiment of this application. The method specifically includes the following steps.

Step 102: Receive draft editing requests sent by at least two client devices for an initial story draft, and add the draft editing request sent by each client device to a draft editing queue.

The client device refers to a terminal device in which a user edits an initial story draft. The initial story draft is a story draft stored in a current server device. The story draft refers to a data structure of a storyboard video editor. The draft editing request is a request for editing an initial story draft. The draft editing queue is a queue storing a draft editing request sent by a client device.

Specifically, the server device receives draft editing requests sent by a plurality of client devices for a target story draft, and successively stores the draft editing request of each client device into the draft editing queue according to a sequence in which the server device receives the draft editing requests.

In a specific implementation of this application, a draft A is used as an example. Draft editing requests of a client device 1, a client device 2, a client device 3, and a client device 4 for the draft A are received. The draft editing request of each of the client device 1, the client device 2, the client device 3, and the client device 4 is added to the draft editing queue.

The server device adds a received draft editing request to the draft editing queue, so that the server device subsequently determines, based on the draft editing request in the draft editing queue, which modifications are to be made to the initial story draft and a modification sequence.

In actual application, that the step of receiving draft editing requests sent by at least two client devices for an initial story draft, and adding the draft editing request sent by each client device to a draft editing queue includes:

determining a request time point for receiving the draft editing request sent by the client device for the initial story draft; and adding the draft editing request of each client device for the initial story draft to the draft editing queue according to the request time point.

The request time point is a time point at which the server device receives the draft editing request. The request time point in which the server device receives the draft editing request sent by each client device is obtained. The draft editing request received by the server device is added to the draft editing queue according to the request time point.

In a specific implementation of this application, the foregoing example is still used. The server device receives the draft editing request sent by each client device for the draft A, and records a time point for receiving each draft editing request. If a time point for receiving the draft editing request of the client device 1 for the draft A is 02:03:15, and a time point for receiving the draft editing request of the client device 2 for the draft A is 02:03:14, the server device first adds, based on the recorded time points, the draft editing request sent by the client device 2 for the draft A to the draft editing queue, and then adds the draft editing request sent by the client device 1 for the draft A to the draft editing queue.

The draft editing request is added to the draft editing queue based on the time point at which the server device receives the draft editing request, so that a sequence of processing the draft editing request is subsequently determined based on the time point at which the server device receives the draft editing request.

Step 104: Extract a first draft editing request of a first client device for the initial story draft from the draft editing queue, obtain first to-be-responded draft information in the first draft editing request, and edit the initial story draft based on the first to-be-responded draft information to obtain an initial modified story draft.

The first client device is a client device that has a draft editing request for the initial story draft, and is one of a plurality of client devices that have draft editing requests for the initial story draft. The first draft editing request is a request sent by the first client device for editing the initial story draft. The first to-be-responded draft information is information that is obtained from the first draft editing request and that is for editing the initial story draft. The initial modified story draft is a draft obtained by modifying the initial story draft according to the first to-be-responded draft information.

Specifically, the draft editing queue includes draft editing information for the initial story draft. The draft editing information for the initial story draft is successively obtained in the draft editing queue. After the first draft editing request sent by the first client device for the initial story draft is obtained, the first to-be-responded draft information in the first draft editing request is extracted. The initial story draft is modified according to the first to-be-responded draft information, for example, a draft is added or deleted in the initial story draft. The initial story draft is modified based on the first to-be-responded draft information, to obtain the initial modified story draft.

In a specific implementation of this application, the client device 3 is used as example. A draft editing request of the client device 3 for a draft B is extracted from the draft editing queue, to obtain draft editing information in the draft editing request. The draft B is edited based on the obtained draft editing information to obtain an edited draft B.

The to-be-responded draft information in the draft editing request is obtained to modify the initial story draft, to update content of the initial story draft in the server device, so that the server device synchronizes real-time editing information of the initial story draft to a client device participating in editing the initial story draft.

Step 106: Extract a second draft editing request of a second client device for the initial story draft from the draft editing queue, obtain second to-be-responded draft information in the second draft editing request, and generate to-be-responded draft information according to the first to-be-responded draft information and the second to-be-responded draft information.

The second client device is a client device that has a draft editing request for the initial story draft, and is a client device in the plurality of client devices that have the draft editing requests for the initial story draft other than the first client device. The second draft editing request is a request sent by the second client device for editing the initial story draft. The second to-be-responded draft information refers to a request that is obtained from the second draft editing request and that is for editing the initial story draft. The to-be-responded draft information is information obtained according to the first to-be-responded draft information and the second to-be-responded draft information.

Specifically, after the second draft editing request sent by the second client device for the initial story draft is obtained in the draft queue, the second to-be-responded draft information in the second draft editing request is extracted, and the to-be-responded draft information is generated based on the first to-be-responded draft information and the second to-be-responded draft information.

In a specific implementation of this application, the foregoing example is still used. A draft editing request of the client device 4 for the draft B is extracted from the draft editing queue, and draft editing information in the draft editing request is extracted. Draft editing information in a draft editing request of the client device 3 for the draft B is obtained. The to-be-responded draft information is obtained according to the draft editing information in the draft editing request of the client device 3 for the draft B and the draft editing information in the draft editing request of the client device 4 for the draft B.

In actual application, a specific method for generating to-be-responded draft information according to the first to-be-responded draft information and the second to-be-responded draft information includes:

> screening the second to-be-responded draft information based on a preset conflict policy and the first to-be-responded draft information, to obtain the to-be-responded draft information.

The preset conflict policy is a policy for processing conflict information that occurs in the first to-be-responded draft information and the second to-be-responded draft information. For example, the preset conflict policy is to determine parameters of a same attribute or parameters of different attributes in the first to-be-responded draft information and the second to-be-responded draft information.

A target attribute parameter in the second to-be-responded draft information is selected by using the preset conflict policy and the first to-be-responded draft information, so that further processing is subsequently performed on the second to-be-responded draft information.

In actual application, the screening the second to-be-responded draft information based on a preset conflict policy and the first to-be-responded draft information, to obtain the to-be-responded draft information includes:

> determining a target attribute parameter in the second to-be-responded draft information based on the preset conflict policy and the first to-be-responded draft information; and deleting draft information corresponding to the target attribute parameter in the second to-be-responded draft information to generate the to-be-responded draft information.

Target attribute parameters are parameters of conflicting attributes in the first to-be-responded draft information and the second to-be-responded draft information. The draft information corresponding to the target attribute parameter refers to a parameter value corresponding to the target attribute parameter.

Specifically, same target attribute parameters in the first to-be-responded draft information and the second to-be-responded draft information are determined based on the preset conflict policy. The draft information corresponding to the target attribute parameter in the second to-be-responded draft information is deleted to obtain the to-be-responded attribute information.

In a specific implementation of this application, for example, the target attribute parameter is a title of a first shot. A version number corresponding to the initial story draft is V1, and information in the initial story draft is shown in Table 1 in the following.

TABLE 1

| Draft version | Title of the first shot | Description information of the first shot | Title of the second shot | Description information of the second shot |
|---|---|---|---|---|
| V1 | Square | The children are playing soccer | Sports meeting | The athletes are racing |

The server device receives to-be-responded information 1 and to-be-responded information 2 that are sent by two client devices. A receiving time of the to-be-responded information 1 is T1, a receiving time of the to-be-responded information 2 is T2, and T1 is earlier than T2. For specific modification content in the to-be-responded information 1 and the to-be-responded information 2 for the initial story draft, refer to Table 2 in the following.

TABLE 2

| To-be-responded information | Title of the first shot | Description information of the first shot | Title of the second shot | Description information of the second shot |
|---|---|---|---|---|
| 1 | Soccer field | | Race | |
| 2 | Playground | There are many people exercising on the playground | | |

The title of the first shot and the title of the second shot are modified in the to-be-responded information 1. The title of the first shot and target information of the first shot are modified in the to-be-responded information 2. The preset conflict policy is to determine same target attribute parameters in the to-be-responded information 1 and the to-be-responded information 2, so that the target attribute parameter can be determined as the "title of the first shot".

The server device first receives the to-be-responded information 1, and modifies an initial story draft V1 based on the to-be-responded information 1 to obtain an initial modified story draft V2, as shown in Table 3 in the following.

TABLE 3

| Draft version | Title of the first shot | Description information of the first shot | Title of the second shot | Description information of the second shot |
|---|---|---|---|---|
| V1 | Square | The children are playing soccer | Sports meeting | The athletes are racing |
| V2 | Soccer field | The children are playing soccer | Race | The athletes are racing |

The to-be-responded information 2 is modified based on the initial story draft of the version V1. In the to-be-responded information 2, the title of the first shot and the description information of the first shot in the initial story draft of the version VI are modified. In this case, the title of the first shot in the version V2 is different from that in the version V1, and the description information of the first shot in the version V2 is the same as that in the version V1. In this case, a modification to the title of the first shot in the to-be-responded information 2 is rejected, and a modification to the description information of the first shot in the to-be-responded information 2 is received. That is, draft editing information "playground" for the title of the first shot in the to-be-responded information 2 is deleted, to obtain modified to-be-responded information 2. The modified to-be-responded information 2 that includes only the description information of the first shot "there are many people exercising on the playground" is used as the to-be-responded information obtained after the draft information corresponding to the same attribute parameter is deleted.

The target attribute parameter in the second to-be-responded draft information is selected based on the preset conflict policy and the first to-be-responded draft information. The draft information corresponding to the target attribute parameter in the second to-be-responded draft information is deleted. This implements screening of the second to-be-responded draft information, facilitating a further modification to the draft based on the to-be-responded draft information obtained through screening, and avoiding a conflict among requests.

Step 108: Edit the initial modified story draft based on the to-be-responded draft information to obtain the target story draft.

The to-be-responded draft information is information that is obtained based on the first to-be-responded draft information and the second to-be-responded draft information and that is used to edit the initial modified story draft. The target story draft is a draft obtained by editing the initial modified story draft according to the to-be-responded draft information.

Specifically, after the to-be-responded information is obtained based on the first to-be-responded information and the second to-be-responded information, initial modification information edited according to the first to-be-responded information is edited based on the to-be-responded information to obtain the target story draft.

In a specific implementation of this application, the foregoing example is still used. The initial modified story draft is edited based on the to-be-responded information that includes the description information of the first shot "there are many people exercising on the playground" to obtain a target story draft V3. In this case, the target story draft V3 is obtained, as shown in Table 4 in the following.

TABLE 4

| Draft version | Title of the first shot | Description information of the first shot | Title of the second shot | Description information of the second shot |
|---|---|---|---|---|
| V1 | Square | The children are playing soccer | Sports meeting | The athletes are racing |
| V2 | Soccer field | The children are playing soccer | Race | The athletes are racing |
| V3 | Soccer field | There are many people exercising on the playground | Race | The athletes are racing |

The initial modified story draft is further modified by using the obtained to-be-responded draft information, so that a conflict situation in which different users process a same attribute is processed, thereby implementing multi-person real-time collaboration for draft editing.

In actual application, before the step of receiving draft editing requests sent by at least two client devices for an initial story draft, the method further includes:

establishing communication connections to the at least two client devices; and sending the initial story draft to the at least two client devices based on the communication connections.

Specifically, to implement real-time synchronization of draft editing information between the client device and the server device, the server device first establishes a communication connection to a client device that has an editing request for the initial story draft, and performs real-time bi-directional transmission of information between the client device and the server device based on the established communication connection, thereby implementing real-time synchronization of the information. After receiving the draft editing request sent by the client device for the initial story draft, the server device transmits and returns an initial story draft of a current version in the server device by using the communication connection to the client device that sends the draft editing request.

By establishing the communication connection between the server device and the client device, real-time bi-directional transmission of data between the server device and the client device can be implemented, thereby implementing real-time synchronization of a draft version between the server device and the client device.

After the communication connection between the server device and each of the at least two client devices is established, the to-be-responded draft information generated by the server device may be sent to the client device based on the established communication connection. That is, after the target story draft is obtained, the data processing method in this application further includes:

transmitting the to-be-responded draft information to the at least two client devices based on the communication connections.

Specifically, to implement synchronization between draft editing information of the server device and draft editing information of each client device, after the server device receives the draft editing information of the client device and updates a draft of the server device based on the draft editing information, the to-be-responded draft information obtained in a process of updating the draft is synchronized to another client device by using a communication connection, so that the client device can further modify a draft of a latest version.

By transmitting the to-be-responded draft information to the at least two client devices by using the communication connections, real-time transmission of the to-be-responded draft information is implemented, thereby implementing an effect of editing the draft in real time by a plurality of persons.

According to the data processing method of this application, the draft editing requests are processed according to the sequence of receiving the draft editing requests. The to-be-responded draft information in the draft editing requests is obtained to further edit the initial story draft. Draft editing requests of different client devices for the initial story draft are responded to in a sequence in the draft editing queue. Draft information for a same attribute in to-be-responded draft information of the different client devices is selected. This avoids a conflict that occurs when the draft is modified in real time, and efficiently processes draft editing information sent by the plurality of persons in real time.

FIG. 2 is a flowchart of a data processing method applied to a client device according to an embodiment of this application. The method specifically includes the following steps.

Step 202: Receive an initial story draft sent by a server device.

A request that is received by the client device and for editing the initial story draft is forwarded to the server device. The server device responds to a draft editing request to return, to the client device, current draft information of the server device, namely, the initial story draft. The client device receives the initial story draft sent by the server device, and saves the initial story draft locally on the client device. Subsequently, a user may edit the initial story draft received by the client device.

Figure 3:
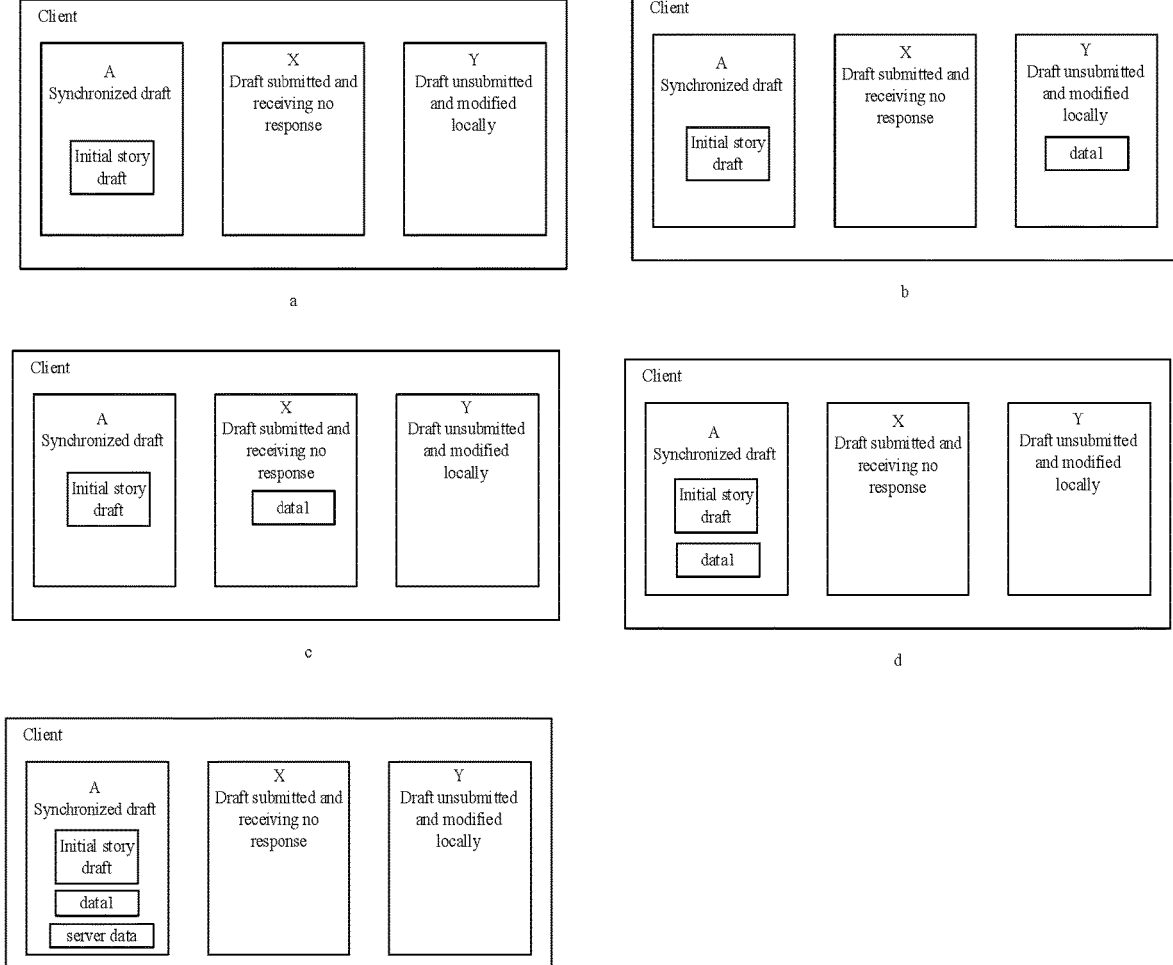
FIG. 3 is a schematic diagram of client device data storage according to an embodiment of this application.

In a specific implementation of this application, for example, the client device includes storage space A, X, and Y. The storage space A stores draft data synchronized between the client device and the server device. The storage space X stores draft data that is submitted to the server device and receives no response from the server device. The storage space Y stores draft information that is locally modified and not submitted to the server device. FIG. 3 is a schematic diagram of client device data storage according to a specific embodiment of this application. As shown in a in FIG. 3, the client device receives the initial story draft sent by the server device and stores the initial story draft in the storage space A.

In actual application, after the step of receiving an initial story draft sent by a server device, the method further includes:

loading the initial story draft to a storyboard draft editor.

The storyboard draft editor is a draft editor with a storyboard function, a storyboard may be planned and designed in the storyboard editor, and a corresponding material resource may be shot based on the storyboard. The initial story draft is loaded to the storyboard draft editor. In structures such as a scene and a shot of a draft included in the draft editor, the initial story draft may be edited according to a designed storyboard structure.

By loading the initial story draft to the storyboard draft editor, the initial story draft can be edited according to a storage structure of the draft in the storyboard.

Step 204: Edit the initial story draft in response to the draft editing request to obtain to-be-submitted draft information.

The draft editing request is a request for editing the initial story draft. The to-be-submitted draft information is draft editing information generated during editing of the initial story draft.

The draft editing request is generated based on a user modification to the initial story draft. The client device receives the editing request for the initial story draft and edits the initial story draft. During editing of the initial story draft, the draft editing information for the initial story draft is generated, namely, the to-be-submitted draft information.

In a specific implementation of this application, the foregoing example is still used. The client device receives the draft editing request for the initial story draft, and edits the initial story draft. During editing of the initial story draft, draft information data1 for editing the initial story draft is obtained. As shown in b in FIG. 3, the to-be-submitted draft information data1 is stored in the storage space Y of the client device.

The to-be-submitted draft information obtained by editing the initial story draft based on the draft editing request is obtained, so that the to-be-submitted draft information is subsequently transmitted to the server device, and conflict processing is performed on to-be-submitted draft information of a plurality of client devices received by the server device.

In actual application, a specific method for editing the initial story draft to obtain to-be-submitted draft information includes:

editing the initial story draft to obtain a to-be-submitted draft; and calculating difference information between the to-be-submitted draft and the initial story draft, and determining that the difference information is the to-be-submitted draft information.

The to-be-submitted draft is a draft obtained after the initial story draft is edited. The difference information is different draft editing information that exists between the to-be-submitted draft and the initial story draft.

Specifically, the initial story draft is edited in response to the draft editing request, to generate the to-be-submitted draft. The initial story draft and the to-be-submitted draft are obtained, and difference information patch between the initial story draft and the to-be-submitted draft is calculated by using a diff algorithm or another algorithm that can achieve a same effect. Step 206: Submit the to-be-submitted draft information to the server device in response to an information submission request, to obtain to-be-responded draft information. A submission operation is performed based on an edited draft, to generate the information submission request, and the to-be-submitted draft information is uploaded to the server device in response to the information submission request.

In a specific implementation of this application, the foregoing example is still used. The information submission request is received, and the to-be-submitted information is uploaded to the server device. In this case, the server device does not respond to the submission request. As shown in c in FIG. 3, the to-be-submitted draft information data1 is combined from the storage space Y into the storage space X, and the storage space Y is cleared.

In actual application, a method for submitting the to-be-submitted draft information to the server device includes:

transmitting the to-be-submitted draft information to the server device based on a communication connection between the server device and the client device.

The to-be-submitted draft information generated by the client device can be synchronized to the server device in real time by using the communication connection.

Step 208: When receiving response information returned by the server device, determine that the to-be-responded draft information is draft modification information.

After responding to the to-be-responded draft information, the server device returns response success information. After the to-be-responded draft information is successfully responded to, the to-be-responded draft information to which is successfully responded is used as the draft modification information.

In a specific implementation of this application, the foregoing example is still used. Response information that is of the to-be-responded draft information and that is returned by the server device is received. It is determined that the to-be-responded draft information data1 is the draft modification information. As shown in d in FIG. 3, the draft modification information is combined from the storage space X into the storage space A, and the storage space X is cleared.

Step 210: Generate a client story draft based on the draft modification information and the initial story draft.

The client story draft is a draft obtained by modifying the initial story draft.

After determining the draft modification information, the client device modifies the initial story draft based on the determined draft modification information, and obtains the client story draft after the initial story draft is modified.

In actual application, in a process of processing the initial data by the client device, the server device may receive a draft editing request sent by another client device, to modify the initial story draft included in the server device. In this case, to implement that the client device modifies a draft of a latest version, a modification needs to be based on the draft editing request. A specific method includes:

receiving the to-be-responded draft information sent by the server device; and updating the initial story draft based on the to-be-responded draft information.

Specifically, the to-be-responded draft information sent by the server device is received. The initial story draft received by the client device is updated based on the to-be-responded draft information, to ensure consistency of draft versions on the client device and the server device. In a specific implementation of this application, the foregoing example is still used. After receiving the initial story draft, the client device receives draft modification information sent by the server device, the draft modification information comprises draft editing data sent from another client device to the server device. As shown in e in FIG. 3, the draft modification information is combined into the storage space A.

According to the data processing method in this application, the to-be-submitted draft information generated during draft editing is obtained, and the to-be-submitted draft information is uploaded to the server device, so that the draft editing information of the client device is synchronized to the server device, and the server device can process and synchronize submitted draft editing information to the another client device. This implements multi-person real-time collaboration for draft editing.

Figure 4B:
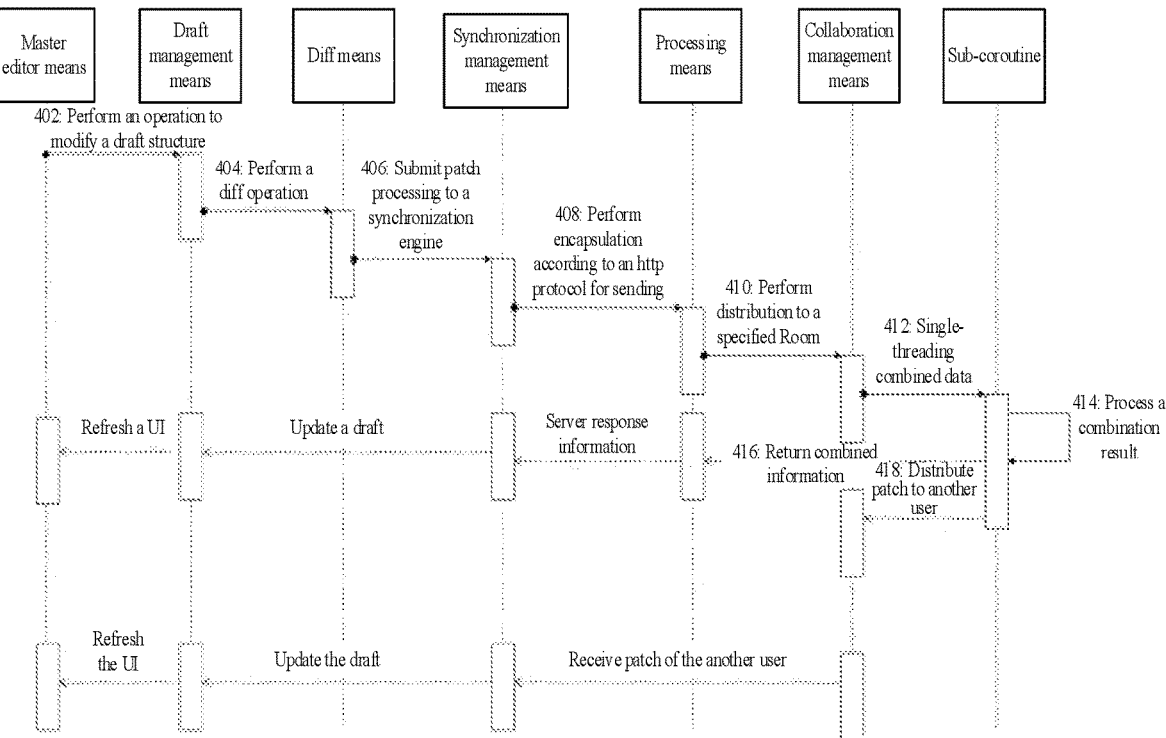
FIG. 4b is a schematic flowchart of a data processing method applied to a client device 5 according to an embodiment of this application.

With reference to FIG. 4a and FIG. 4b, the data processing method is further described below by using an example of application of the data processing method provided in this application to a client device 5. FIG. 4a is a processing flowchart of a data processing method applied to a client device 5 according to an embodiment of this application. FIG. 4b is a schematic processing flowchart of a data processing method applied to a client device 5 according to an embodiment of this application. The method specifically includes the following steps:

Step 402: Edit the initial story draft to obtain a to-be-submitted draft.

In a specific implementation of this application, the client device 5 is used as an example. The client device 5 receives the initial story draft sent by the server device, and uploads the initial story draft to the storyboard draft editor. A draft editing room G includes three client devices {the client device 3, the client device 4, and the client device 5} that have editing requests for the initial story draft. The user edits the initial story draft in the storyboard editor by using the client device 5, including modifying a draft structure, to obtain an edited initial story draft being the to-be-submitted draft. A master editor means synchronizes a modification operation on the draft structure of the initial story draft to the to-be-submitted draft for synchronizing to a draft management means.

Step 404: Calculate difference information between the initial story draft and the to-be-submitted draft.

In a specific implementation of this application, the foregoing example is still used. The draft management means includes the initial story draft and the to-be-submitted draft. The draft management means synchronizes the to-be-submitted draft to a diff means. The diff algorithm is used to calculate the difference information patch between the initial story draft and the to-be-submitted draft, that is, which editing operations can be performed on the initial story draft to obtain the to-be-submitted draft.

Step 406: Send the difference information to a synchronization management means.

In a specific implementation of this application, the foregoing example is still used. The difference information patch calculated by using the diff algorithm is sent to the synchronization management means, to synchronize a current draft of the client device 5, is stored to the client device as to-be-responded draft information, and is in a to-be-submitted state before a submission request is received.

Step 408: Send the difference information to the server device based on a communication connection.

In a specific implementation of this application, the foregoing example is still used. Based on the communication connection established between the server device and the client device 5, the difference information is sent to the server device. Specifically, the difference information is encapsulated and sent to the server device according to an http protocol.

Step 410: The server device receives the difference information and distributes the difference information to a corresponding draft editing room.

In a specific implementation of this application, the foregoing example is still used. A processing means in the server device receives the difference information, and distributes the received difference information to the draft editing room G corresponding to the difference information.

Step 412: Combine the received difference information to obtain combined editing information.

In a specific implementation of this application, the foregoing example is still used. The server device receives the difference information sent by the client device 3, the client device 4, and the client device 5. If there is a conflict between the difference information, a Room management and collaboration means processes the conflict, that is, combines single-threading difference information. For example, if the client device 4 and the client device 5 make different modifications to a same attribute in the initial story draft, it is determined that there is a conflict situation. In this case, the server device processes first submitted difference information, namely, the difference information submitted by the client device 5, and rejects a modification in the difference information of the client device 4 to the same attribute, thereby obtaining the combined editing information.

Step 414: Edit the initial modified story draft based on the combined editing information.

In a specific implementation of this application, the foregoing example is still used. After responding to the difference information submitted by the client device 5, the server device processes the initial story draft to obtain the initial modified story draft. A sub-coroutine further modifies the initial modified story draft according to the obtained combined editing information, to complete a response to the difference information submitted by the client device 5 and the client device 4.

Step 416: Return combined information to the client device based on the communication connection.

In a specific implementation of this application, the foregoing example is still used. That the submitted draft editing information is edited successfully is returned to the client device 5.

Step 418: Synchronize the combined editing information to another client device.

In a specific implementation of this application, the foregoing example is still used. The combined editing information is synchronized to the client device 3 and the client device 4 that are located in the same draft editing room as the client device 5.

According to the data processing method applied to the client device 5 in this embodiment, the draft is edited in the storyboard draft editor that stores a draft according to a draft storage structure of a scene or a shot, so that the user can logically edit the draft. By converting the draft storage structure into a json format and processing the conflict situation in the draft editing information, real-time synchronization of the draft editing information is implemented. By calculating the difference editing information in the draft before and after editing, synchronous transmission of the draft editing information and asynchronous and synchronous transmission of corresponding media resources are implemented.

Figure 5:
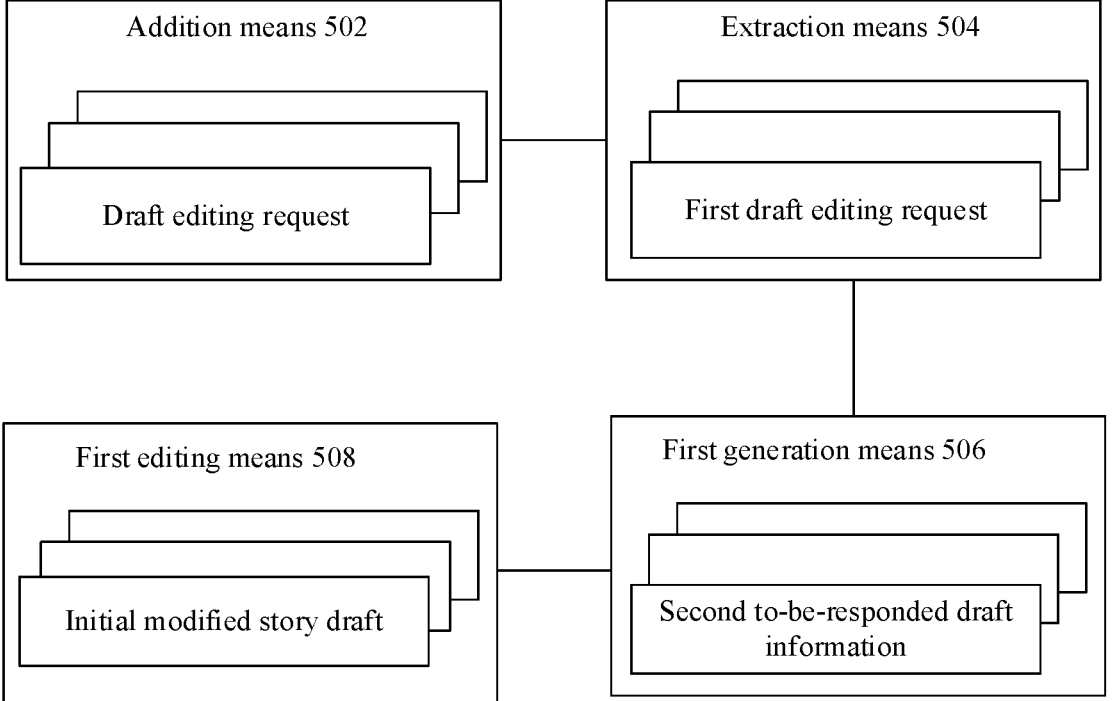
FIG. 5 is a schematic diagram of a structure of a data processing apparatus applied to a server device according to an embodiment of this application.

Corresponding to the foregoing method embodiment, this application further provides an embodiment of a data processing apparatus. FIG. 5 is a schematic diagram of a structure of a data processing apparatus applied to a server device according to an embodiment of this application. As shown in FIG. 5, the apparatus includes:

an addition means 502, configured to: receive draft editing requests sent by at least two client devices for an initial story draft, and add the draft editing request sent by each client device to a draft editing queue;

an extraction means 504, configured to: extract a first draft editing request of a first client device for the initial story draft from the draft editing queue, obtain first to-be-responded draft information in the first draft editing request, and edit the initial story draft based on the first to-be-responded draft information to obtain an initial modified story draft;

a first generation means 506, configured to: extract a second draft editing request of a second client device for the initial story draft from the draft editing queue, obtain second to-be-responded draft information in the second draft editing request, and generate to-be-responded draft information according to the first to-be-responded draft information and the second to-be-responded draft information; and a first editing means 508, configured to edit the initial modified story draft based on the to-be-responded draft information to obtain a target story draft.

In a specific embodiment of this application, the addition means 502 is further configured to:

determine a request time point for receiving the draft editing request sent by the client device for the initial story draft; and add the draft editing request of each client device for the initial story draft to the draft editing queue according to the request time point.

The first generation means 506 is further configured to:

screen the second to-be-responded draft information based on a preset conflict policy and the first to-be-responded draft information, to obtain the to-be-responded draft information.

The first generation means 506 is further configured to:

determine a target attribute parameter in the second to-be-responded draft information based on the preset conflict policy and the first to-be-responded draft information; and delete draft information corresponding to the target attribute parameter in the second to-be-responded draft information to generate the to-be-responded draft information.

The apparatus further includes an establishment means, configured to:

establish communication connections to the at least two client devices; and send the initial story draft to the at least two client devices based on the communication connections.

The apparatus further includes a transmission means, configured to:

transmit the to-be-responded draft information to the at least two client devices based on the communication connections.

The data processing apparatus applied to the server device in this application includes: the addition means, configured to receive draft editing requests sent by at least two client devices for an initial story draft, and add the draft editing request sent by each client device to a draft editing queue; the extraction means, configured to extract a first draft editing request of a first client device for the initial story draft from the draft editing queue, obtain first to-be-responded draft information in the first draft editing request, and edit the initial story draft based on the first to-be-responded draft information to obtain an initial modified story draft; the first generation means, configured to extract a second draft editing request of a second client device for the initial story draft from the draft editing queue, obtain second to-be-responded draft information in the second draft editing request, and generate to-be-responded draft information according to the first to-be-responded draft information and the second to-be-responded draft information; and the first editing means, configured to edit the initial modified story draft based on the to-be-responded draft information to obtain a target story draft.

According to the data processing apparatus applied to the server device in this application, the draft editing requests are processed according to the sequence of receiving the draft editing requests. The to-be-responded draft information in the draft editing requests is obtained to further edit the initial story draft. Draft editing requests of different client devices for the initial story draft are responded to in a sequence in the draft editing queue. Draft information for a same attribute in to-be-responded draft information of the different client devices is selected. This avoids a conflict that occurs when the draft is modified in real time, and efficiently processes draft editing information sent by a plurality of persons in real time.

Figure 6:
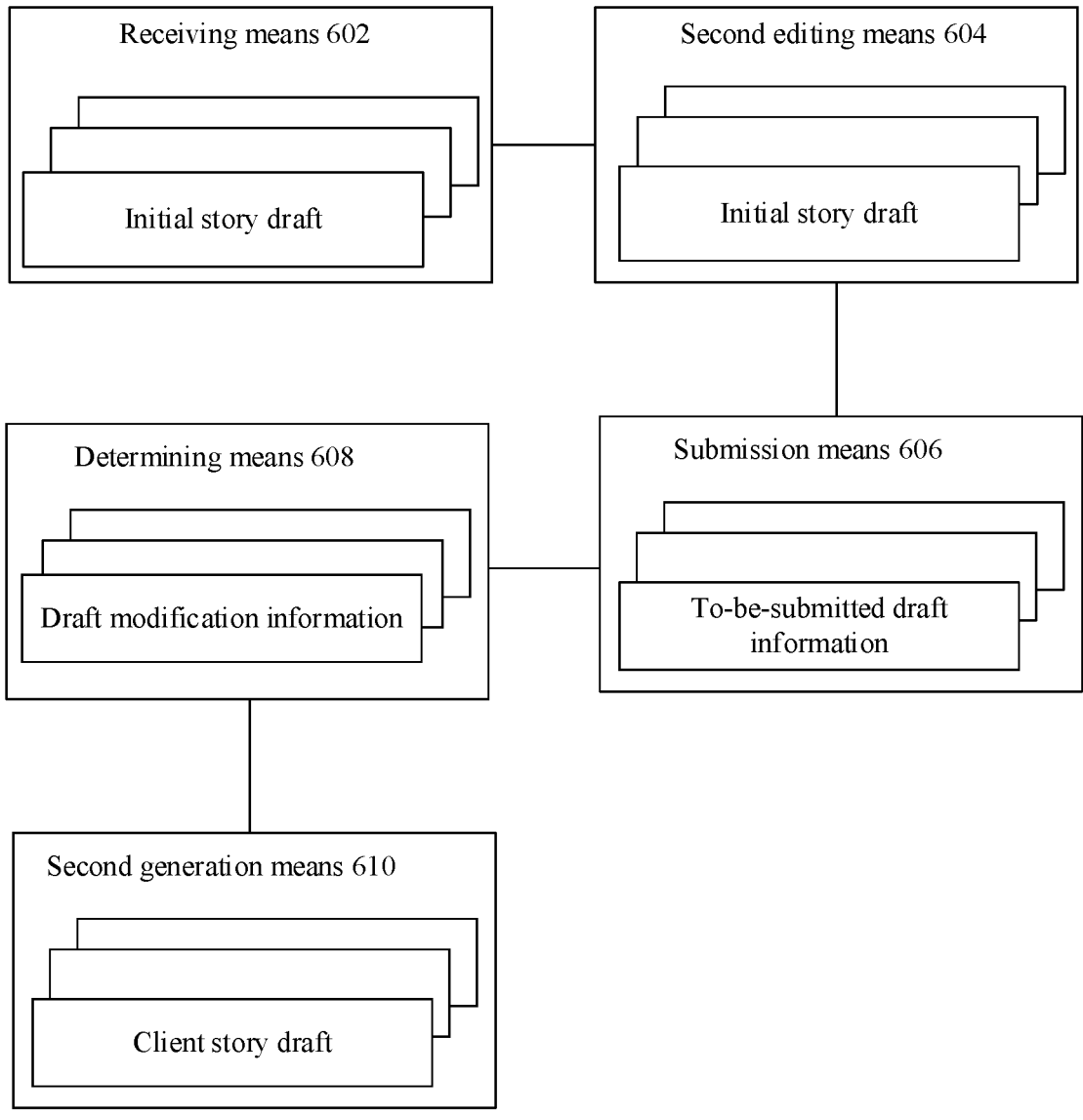
FIG. 6 is a schematic diagram of a structure of a data processing apparatus applied to a client device according to an embodiment of this application.

Corresponding to the foregoing method embodiment, this application further provides an embodiment of a data processing apparatus. FIG. 6 is a schematic diagram of a structure of a data processing apparatus applied to a client device according to an embodiment of this application. As shown in FIG. 6, the apparatus includes:

a receiving means 602, configured to receive an initial story draft sent by a server device;

a second editing means 604, configured to edit the initial story draft in response to a draft editing request to obtain to-be-submitted draft information;

a submission means 606, configured to submit the to-be-submitted draft information to the server device in response to an information submission request, to obtain to-be-responded draft information;

a determining means 608, configured to: when response information returned by the server device is received, determine that the to-be-responded draft information is draft modification information; and a second generation means 610, configured to generate a client story draft based on the draft modification information and the initial story draft.

In a specific implementation of this application, the second editing means 604 is further configured to:

edit the initial story draft to obtain a to-be-submitted draft; and calculate difference information between the to-be-submitted draft and the initial story draft, and determine that the difference information is the to-be-submitted draft information.

The submission means 606 is further configured to:

transmit the to-be-submitted draft information to the server device based on a communication connection between the server device and the client device.

The apparatus further includes an updating means, configured to:

receive the to-be-responded draft information sent by the server device; and update the initial story draft based on the to-be-responded draft information.

The apparatus further includes a load means, configured to:

load the initial story draft to a storyboard draft editor.

The data processing apparatus applied to the client device in this application includes: the receiving means, configured to receive an initial story draft sent by a server device; the second editing means, configured to edit the initial story draft in response to a draft editing request to obtain to-be-submitted draft information; the submission means, configured to submit the to-be-submitted draft information to the server device in response to an information submission request, to obtain to-be-responded draft information; the determining means, configured to: when response information returned by the server device is received, determine that the to-be-responded draft information is draft modification information; and the second generation means, configured to generate a client story draft based on the draft modification information and the initial story draft. According to the data processing apparatus applied to the client device in this application, the to-be-submitted draft information generated during draft editing is obtained, and the to-be-submitted draft information is uploaded to the server device, so that draft editing information of the client device is synchronized to the server device, and the server device can process and synchronize submitted draft editing information to another client device. This implements multi-person real-time collaboration for draft editing.

The foregoing describes a schematic solution of the data processing apparatus in the embodiments. It should be noted that the technical solution of the data processing apparatus and the technical solution of the foregoing data processing method belong to a same concept. For details not described in detail in the technical solution of the data processing apparatus, refer to the descriptions of the technical solution of the foregoing data processing method.

Figure 7:
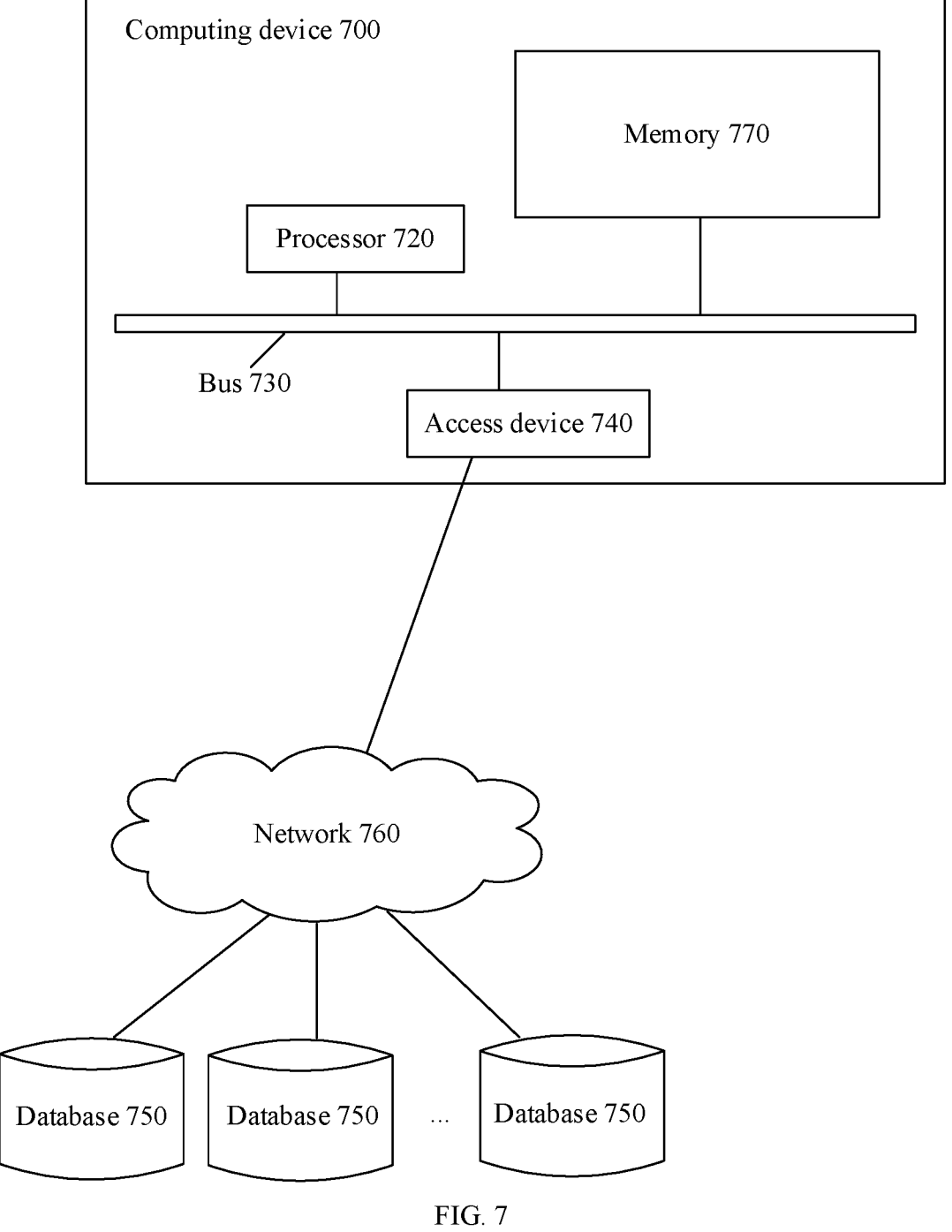
FIG. 7 is a block diagram of a structure of a computing device according to an embodiment of this application.

FIG. 7 is a block diagram of a structure of a computing device 700 according to an embodiment of this application. Components of the computing device 700 include but are not limited to a memory 710 and a processor 720. The processor 720 is connected to the memory 710 by using a bus 730. A database 450 is configured to store data.

The computing device 700 further includes an access device 740. The access device 740 enables the computing device 700 to perform communication by using one or more networks 460. Examples of these networks include a public switched telephone network (PSTN), a local area network (LAN), a wide area network (WAN), a private area network (PAN), or a combination of communication networks such as the Internet. The access device 740 may include one or more of any type of wired or wireless network interface (for example, a network interface card (NIC)), such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this application, the foregoing components of the computing device 700 and other components not shown in FIG. 7 may be connected to each other, for example, by using a bus. It should be understood that the block diagram of the structure of the computing device shown in FIG. 7 is merely used as an example instead of a limitation on the scope of this application. A person skilled in the art can add or replace other components as required.

The computing device 700 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), or another type of mobile device, or a stationary computing device such as a desktop computer or a PC. The computing device 700 may alternatively be a mobile or stationary server device.

When the processor 720 executes computer instructions, the steps of the data processing method are implemented.

The foregoing describes a schematic solution of a computing device in this embodiment. It should be noted that the technical solution of the computing device and the technical solution of the foregoing data processing method belong to a same concept. For details not described in detail in the technical solution of the computing device, refer to the descriptions of the technical solution of the foregoing data processing method.

An embodiment of this application further provides a computer-readable storage medium, storing computer instructions, and the computer instructions are executed by a processor to implement the steps of the foregoing data processing method.

The foregoing describes a schematic solution of the computer-readable storage medium in this embodiment. It should be noted that the technical solution of the storage medium and the technical solution of the data processing method belong to a same concept. For details not described in detail in the technical solution of the storage medium, refer to the descriptions of the technical solution of the data processing method.

An embodiment of this application further provides a computer program, and when the computer program is executed on a computer, the computer is enabled to perform the steps of the data processing method.

The foregoing describes a schematic solution of the computer program in this embodiment. It should be noted that the technical solution of the computer program and the technical solution of the data processing method belong to a same concept. For details not described in detail in the technical solution of the computer program, refer to the descriptions of the technical solution of the data processing method.

Specific embodiments of this application are described above. Other embodiments fall within the scope of the appended claims. In some cases, actions or steps described in the claims may be performed in an order different from that in the embodiments and desired results may still be achieved. In addition, processes described in the accompanying drawings do not necessarily require shown specific orders or sequences to achieve the desired results. In some implementations, multitasking and parallel processing are also possible or may be advantageous.

The computer instructions include computer program code, and the computer program code may be in a source code form, an object code form, an executable file form, some intermediate forms, or the like. The computer-readable medium may include: any entity or apparatus, a recording medium, a USB flash drive, a removable hard disk, a magnetic disk, a compact disc, a computer memory, a read-only memory (ROM), a random access memory (RAM), an electrical carrier signal, a telecommunication signal, a software distribution medium, and the like that are capable of carrying the computer program code. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal or a telecommunication signal.

It should be noted that, for brief description, the foregoing method embodiments are represented as a combination of a series of actions. However, a person skilled in the art should be aware that this application is not limited to the described order of the actions, because some steps may be performed in other orders or simultaneously according to this application. In addition, a person skilled in the art should also be aware that the embodiments described in this specification are all example embodiments, and used actions and means are not necessarily mandatory to this application.

In the foregoing embodiments, the descriptions of the embodiments have respective focuses. For a part that is not described in detail in a specific embodiment, refer to related descriptions in other embodiments.

The example embodiments of this application disclosed above are merely intended to help describe this application. In the optional embodiments, not all details are described in detail, and the present invention is not limited to only the specific implementations. Clearly, many modifications and variations may be made based on the content of this application. In this application, these embodiments are selected and specifically described to better explain the principle and actual application of this application, so that a person skilled in the art can well understand and use this application. This application is only subject to the claims and a full scope and equivalents thereof.

What is claimed is:

1. A method of processing data, applied to a server device, and comprising:

receiving draft editing requests for editing an initial story draft from at least two client devices, and adding each of the draft editing requests to a draft editing queue, wherein a story draft comprises a data structure of a storyboard video editor, and wherein the draft editing queue is configured to sequentially store a plurality of draft editing requests from a plurality client devices based on time points of receiving the plurality of draft editing requests;

extracting a first draft editing request for editing the initial story draft by a first client device from the draft editing queue, and obtaining first draft editing information in the first draft editing request;

editing the initial story draft based on the first draft editing information to obtain an initial modified story draft, wherein the first client device is among the at least two client devices;

extracting a second draft editing request for editing the initial story draft by a second client device from the draft editing queue, and obtaining second draft editing information in the second draft editing request;

determining that a portion of the second draft editing information is associated with an attribute parameter and that a portion of the first draft editing information is associated with the same attribute parameter;

deleting, based on a preset conflict policy, the portion of the second draft editing information, wherein the second draft editing information without the portion of the second draft editing information comprises screened second draft editing information;

generating to-be-responded draft information based on the first draft editing information and the screened second draft editing information, wherein the second client device is among the at least two client devices; and editing the initial modified story draft based on the to-be-responded draft information to generate an updated story draft.

2. The method according to claim 1, wherein the portion of the second draft information associated with the attribute parameter comprises a parameter value of the attribute parameter.

3. The method according to claim 1, wherein before receiving the draft editing requests for editing the initial story draft from the at least two client devices, the method further comprises:

establishing communication connections with the at least two client devices; and sending the initial story draft to the at least two client devices based on the communication connections.

4. The method according to claim 1, wherein the method further comprises:

establishing communication connections with the at least two client devices; and implementing real-time data transmission between the server and the at least two client devices based on the communication connections.

5. A method of processing data, comprising:

receiving, at a client device, an initial story draft sent from a server device;

loading the initial story draft to a storyboard draft editor, wherein the storyboard draft editor is configured to plan a storyboard and shoot material resources based on the storyboard;

editing the initial story draft via the storyboard draft editor;

generating to-be-submitted draft information during the editing the initial story draft, wherein the to-be-submitted draft information comprises first draft editing information for the initial story draft;

synchronizing the to-be-submitted draft information to the server device in real time;

receiving draft modification information from the server device, wherein the draft modification information comprises second draft editing information synchronized to the server device by one or more other client devices, and wherein the client device and the one or more other client devices are performing real-time collaboration of editing the same story draft;

receiving an indication that a portion of the first draft editing information was not applied to the initial story draft, wherein the portion of the first draft editing information is associated with a same target parameter as a portion of the draft modification information received from the server device, and wherein a preset conflict policy caused the portion of the first draft editing information to be deleted; and generating a client story draft based on the draft modification information and the initial story draft.

6. The method according to claim 5, wherein the generating to-be-submitted draft information comprises:

editing the initial story draft to obtain a to-be-submitted story draft;

calculating difference information between the to-be-submitted story draft and the initial story draft; and identifying the difference information as the to-be-submitted draft information.

7. The method according to claim 5, wherein the synchronizing the to-be-submitted draft information to the server device comprises:

transmitting the to-be-submitted draft information to the server device based on a communication connection between the server device and each client device.

8. A server computing device, comprising a memory, a processor, wherein computer instructions are stored in the memory and executable by the processor, and wherein the computer instructions, upon execution by the processor, cause the processor to implement operations comprising:

receiving draft editing requests for editing an initial story draft from at least two client devices, and adding each of the draft editing requests to a draft editing queue, wherein a story draft comprises a data structure of a storyboard video editor, and wherein the draft editing queue is configured to sequentially store a plurality of draft editing requests from a plurality client devices based on time points of receiving the plurality of draft editing requests;

extracting a first draft editing request for editing the initial story draft by a first client device from the draft editing queue, and obtaining first draft editing information in the first draft editing request;

editing the initial story draft based on the first draft editing information to obtain an initial modified story draft, wherein the first client device is among the at least two client devices;

extracting a second draft editing request for editing the initial story draft by a second client device from the draft editing queue, and obtaining second draft editing information in the second draft editing request;

determining a portion of the second draft editing information is associated with an attribute parameter and a portion of the first draft editing information is associated with the same attribute parameter;

deleting, based on a preset conflict policy, the portion of the second draft editing information, wherein the second draft editing information without the portion of the second draft editing information comprises screened second draft editing information;

generating to-be-responded draft information based on the first draft editing information and the screened second draft editing information, wherein the second client device is among the at least two client devices; and editing the initial modified story draft based on the to-be-responded draft information to generate an updated story draft.

9. The server computing device according to claim 8, wherein the portion of the second draft information associated with the attribute parameter comprises a parameter value of the attribute parameter.

10. The server computing device according to claim 8, wherein before receiving the draft editing requests for editing the initial story draft from the at least two client devices, the method further comprises:

establishing communication connections with the at least two client devices; and sending the initial story draft to the at least two client devices based on the communication connections.

11. The server computing device according to claim 8, wherein the operations further comprise:

establishing communication connections with the at least two client devices; and implementing real-time data transmission between the server and the at least two client devices based on the communication connections.

12. A client computing device, comprising a memory, a processor, wherein computer instructions are stored in the memory and executable by the processor, and wherein the computer instructions, upon execution by the processor, cause the processor to implement operations comprising:

receiving an initial story draft sent from a server device;

loading the initial story draft to a storyboard draft editor, wherein the storyboard draft editor is configured to plan a storyboard and shoot material resources based on the storyboard;

editing the initial story draft via the storyboard draft editor;

generating to-be-submitted draft information during the editing the initial story draft, wherein the to-be-submitted draft information comprises first draft editing information for the initial story draft;

synchronizing the to-be-submitted draft information to the server device in real time;

receiving draft modification information from the server device, wherein the draft modification information comprises second draft editing information synchronized to the server device by one or more other client computing devices, and wherein the client computing device and the one or more other client computing devices are performing real-time collaboration of editing the same story draft;

receiving an indication that a portion of the first draft editing information was not applied to the initial story draft, wherein the portion of the first draft editing information is associated with a same target parameter as a portion of the draft modification information received from the server device, and wherein a preset conflict policy caused the portion of the first draft editing information to be deleted; and generating a client story draft based on the draft modification information and the initial story draft.

13. The client computing device according to claim 12, wherein the generating to-be-submitted draft information comprises:

editing the initial story draft to obtain a to-be-submitted story draft;

calculating difference information between the to-be-submitted story draft and the initial story draft; and identifying the difference information as the to-be-submitted draft information.

14. The client computing device according to claim 12, wherein the synchronizing the to-be-submitted draft information to the server device comprises:

transmitting the to-be-submitted draft information to the server device based on a communication connection between the server device and the client computing device.

* * * * *